(12) United States Patent
Koren et al.

(10) Patent No.: US 6,826,368 B1
(45) Date of Patent: Nov. 30, 2004

(54) WAVELENGTH DIVISION MULTIPLEXING (WDM) WITH MULTI-FREQUENCY LASERS AND OPTICAL COUPLERS

(75) Inventors: Uziel Koren, Kiryat Tivon (IL); Francis R. Waldman, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/175,269

(22) Filed: Oct. 20, 1998

(51) Int. Cl.⁷ .............................................. H04J 14/00
(52) U.S. Cl. ..................... 398/50; 398/79; 398/45; 398/47; 398/48; 398/49; 398/52; 398/55; 398/56; 370/475; 370/466
(58) Field of Search .................. 398/45, 47, 48, 398/49, 50, 52, 55, 56, 79; 370/475, 466

(56) References Cited

U.S. PATENT DOCUMENTS

| | | | | |
|---|---|---|---|---|
| 5,018,130 A | * | 5/1991 | Suzuki et al. ................... 370/1 |
| 5,093,743 A | * | 3/1992 | Eng et al. ................... 359/120 |
| 5,351,146 A | | 9/1994 | Chan et al. |
| 5,504,609 A | | 4/1996 | Alexander et al. |
| 5,550,818 A | * | 8/1996 | Brackett et al. ............... 370/60 |
| 5,559,624 A | | 9/1996 | Darcie et al. |
| 5,734,486 A | * | 3/1998 | Guillemot et al. .......... 359/139 |
| 5,828,472 A | * | 10/1998 | Masetti ....................... 359/123 |
| 5,892,604 A | * | 4/1999 | Yamanaka et al. .......... 359/128 |
| 5,903,559 A | * | 5/1999 | Acharya et al. ............. 370/355 |
| 5,920,705 A | * | 7/1999 | Lyon et al. ................ 395/200.7 |
| 5,956,334 A | * | 9/1999 | Chu et al. .................... 370/352 |
| 6,043,915 A | * | 3/2000 | Giles et al. .................. 359/132 |
| 6,078,586 A | * | 6/2000 | Dugan et al. ................ 370/395 |
| 6,111,673 A | * | 8/2000 | Chang et al. ................ 359/123 |
| 6,154,463 A | * | 11/2000 | Aggarwal et al. .......... 370/408 |
| 6,226,296 B1 | * | 5/2001 | Lindsey et al. ............. 370/401 |
| 6,233,245 B1 | * | 5/2001 | Chapman et al. ........... 370/412 |
| 6,266,339 B1 | * | 7/2001 | Donahue et al. ............ 370/432 |
| 6,275,494 B1 | * | 8/2001 | Endo et al. .................. 370/395 |
| 6,279,035 B1 | * | 8/2001 | Brown et al. ................ 709/224 |
| 6,301,223 B1 | * | 10/2001 | Brastar et al. .............. 370/227 |
| 6,535,313 B1 | * | 3/2003 | Fatehi et al. ................. 359/139 |

* cited by examiner

Primary Examiner—Hanh Phan (57) ABSTRACT

The present invention relates to an optical switching device for WDM systems based on multi-frequency lasers and optical couplers. A router/switch mapping of IP (or other protocols) subnets or addresses to an optical channel instead of a physical interface. Another embodiment of the invention implements the mapping directly at the source where the data transmission originates. The invention allows integration of WDM in the routers and switches, and ultimately in the information source. As a result, unnecessary opto-electrical conversion steps and physical interfaces are eliminated.

18 Claims, 8 Drawing Sheets

WAVELENGTH DIVISION MULTIPLEXING (WDM) WITH MULTI-FREQUENCY LASERS AND OPTICAL COUPLERS

FIELD OF INVENTION

The field of invention is optical communications, particularly wavelength division multiplexing.

BACKGROUND OF THE INVENTION

Optical communications is a fast-growing field. An optical communication system refers to any system that uses optical signals to convey information over an optical waveguiding medium. Optical communication systems can be employed in telecommunications, cable television, local area networks, etc.

It has been found that the usable transmission capacity of a given optical transmission medium can be substantially increased by use of wavelength division multiplexing, or WDM. With WDM, two or more channels are provided over a common optical waveguide, the channels being differentiated by optical wavelength. Signal transmission is distributed to designated locations via routers or switches.

While it is well known in the art to transmit the local router or switch output as an optical signal, that signal is not compatible with the optical signal used in the WDM equipment. Thus, at the point of interface with the WDM system, the optical signal from the originating switch/router is converted into an electrical signal, which is converted in turn into another optical signal compatible with the WDM system in order to be transmitted over the WDM portion of the transmission path, such as a Wide Area Network (WAN).

Systems use optical-electrical-optical conversion at the WDM interface because the characteristics of the optical signal generated by the sources currently used in the art, such as spectrum, power, etc., are incompatible with the signals used in the WDM equipment. These conversion steps are cumbersome and resource-consuming. For larger data transmission systems, resources (such as modulation devices or router/switch interfaces) required to perform opto-electrical conversion are prohibitively costly. Therefore, there is a need for a more efficient optical system that performs the same function of data transmission without requiring unduly cumbersome opto-electrical conversion steps, while using substantially less interface connections on the routers/switches.

SUMMARY OF THE INVENTION

It is desirable to avoid the optical-electrical-optical conversion of the present WDM systems, an objective realized according to the invention by causing the output signal from the router to be in an optical form compatible with the WDM equipment. This will result in two advantages: direct compatibility with modem WDM transmission systems in the WAN, and optical switching in the LAN (Local Area Network) and MAN (Metropolitan Area Network). In order to accomplish this, the network address/subnet for an originating signal is mapped at the router output directly to the optical channel for that address in the WDM system. To this end, the originating switches and/or routers are equipped with multi-frequency laser arrays and multi-channel receivers. The same implementation can also be applied for the originating network or host. For implementation in a WDM environment, network addresses are mapped to different wavelengths. The method of the invention maps a network address/sub-network directly from a source/originating network to a channel of a multi-channel optical transmission medium (typically a WDM optical system) thereby effecting integration of the optical channel in the originating routers and switches.

The invention advantageously removes unnecessary, expensive opto-electric conversion procedures at the WDM interface by directly mapping the network address/subnet to the WDM wavelength associated with that address/subnet at a local network, router or switch. Another embodiment of the invention maps the network address/subnet to the WDM wavelength directly at the information source, i.e., routers/switches and ultimately the hosts (computers) where the data originate. In addition to elimination of unnecessary, cumbersome opto-electrical conversion steps, the invention greatly reduces the number of Optical/electrical interfaces needed to interconnect a large number of routers and switches over local or wide area networks by integrating WDM address mapping functions onto the local network routers/switches or the information source directly.

BRIEF DESCRIPTION OF THE DRAWINGS

A more complete understanding of the present invention may be obtained by reading the following description of specific illustrative embodiments of the invention in conjunction with the accompanying drawings in which.

DETAILED DESCRIPTION

Figure 1:
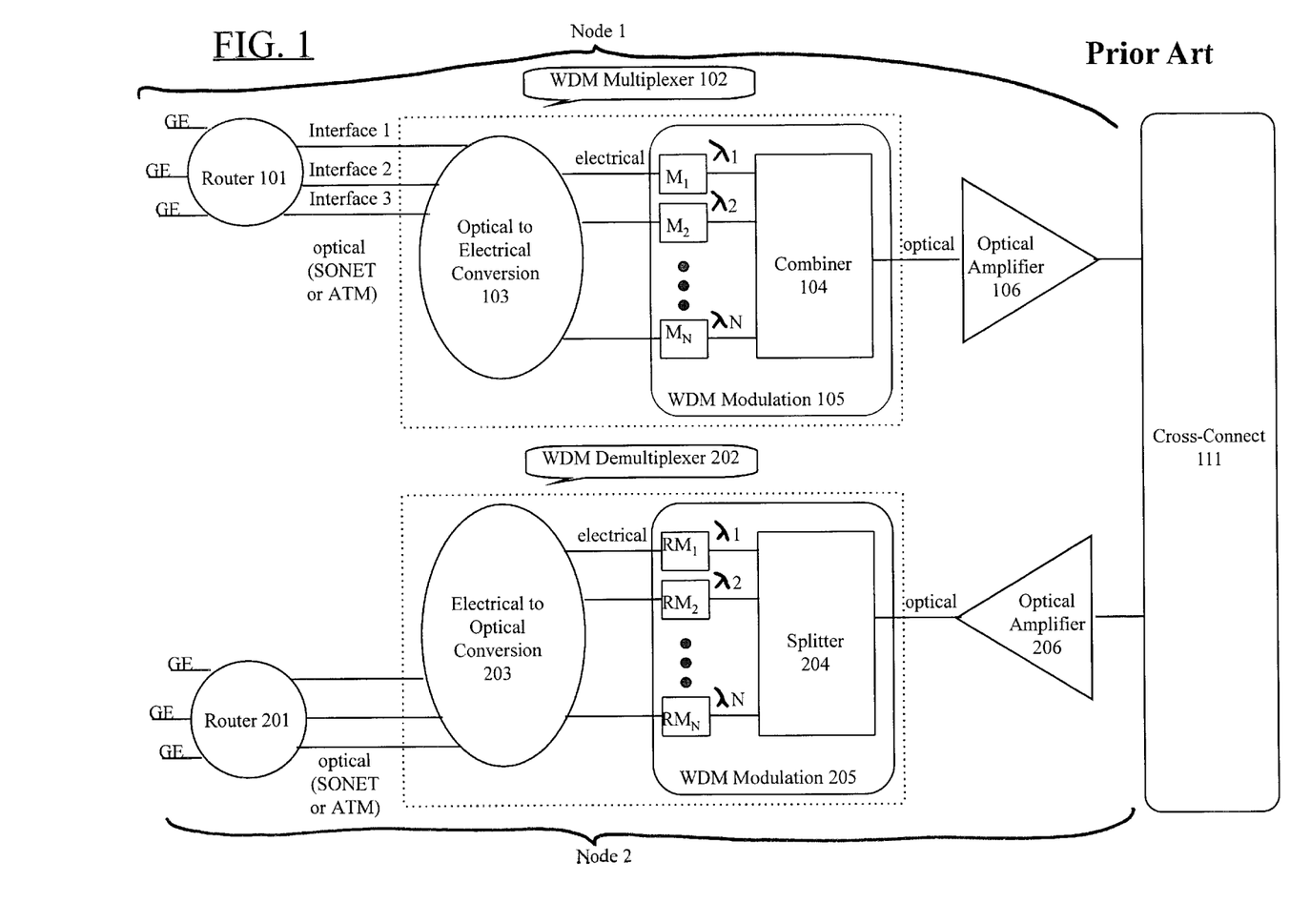
FIG. 1 shows a conventional WDM network system in a wide area network (WAN) environment.

FIG. 1 illustrates implementation of data transmission in a conventional WDM network system in a WAN environment. In particular, FIG. 1 shows a conventional WDM system in a large Internet Service Provider's backbone. Data received from the Internet access servers as well as the information servers, e.g., World Wide Web servers, which are not illustrated in the figure, reach the wide area backbone routers (101, 201) over multiple high speed Gigabit Ethernet (GE) or 100 Mbit Ethernet interfaces. The backbone routers are interconnected via WDM wide area connections. For each node on the backbone a router has to reach, there is an interface through which data traffic destined to that particular node are transmitted. The particular interface is usually a SONET or ATM interface at high speeds, e.g., 2.5 Gbit SONET OC-48, or an ATM OC-12. Although SONET and ATM are optical communication schemes, the interfaces are non-WDM-compatible because SONET and ATM are not mapped to WDM. When Router 101 is directed to send a data packet to Router 201, a signal is sent from Router 101 to WDM Multiplexer 102 over Interface 1. Note that the signal sent from Router 101 to WDM Multiplexer 102 is optical. Once WDM Multiplexer 102 receives the signal from Router 101, the conversion device at 103 converts the optical signal into an electrical signal. This electrical signal, representing data communication between Nodes 1 and 2, is converted into a modulated optical signal again, this time using optical source MI that generates the signal $\lambda_1$. In the same manner, signals destined to Node 3 (not shown in the figure) exit Router 101 over Interface 2. After opto-electrical conversion, the electrical signal is fed into WDM generator M2, where it is modulated with an optical signal $\lambda_2$. The larger the network, the more optical interfaces Router 101, 201, etc., must support. Combiner 104 optically combines all the signals bearing WDM wavelength information for amplification in Optical Amplifier 106, which -in turn sends the amplified, combined signal to Cross-Connect 111. Cross-Connect 111 can be an ATM switch or SONET multiplexer. Switching/cross-connection can be carried out in the optical or electrical domains. In the latter case, optical-to-electrical conversion is performed again.

After Cross-Connect 111 directs the information-bearing signal to Optical Amplifier 206 for amplification, the signal is split by Splitter 204 into signals $\lambda_1, \lambda_2, \ldots, \lambda_N$, for conversion by $RM_1, RM_2, \ldots, RM_N$, respectively, according to WDM wavelengths $\lambda_1, \lambda_2, \ldots, \lambda_N$. The signals are converted into electrical signals, demultiplexed if needed, and converted into optical signals at 203. The signal is then transmitted to Router 201 where an optical-to-electrical conversion takes place. The resulting electrical signal is forwarded to the appropriate Ethernet interface on the router.

Figure 2:
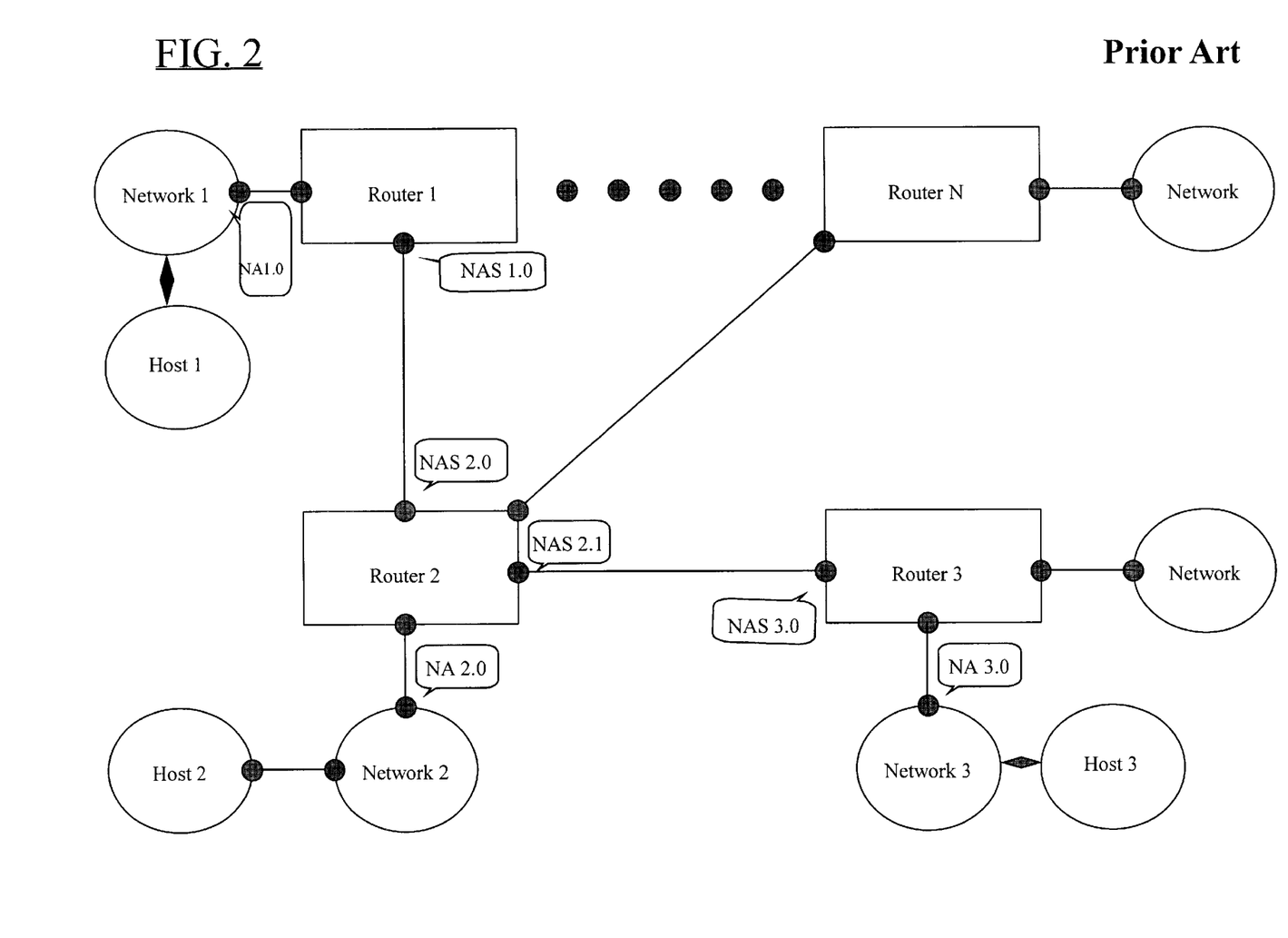
FIG. 2 shows a conventional non-WDM network system with routers.

For illustration of another prior art system, FIG. 2 shows an IP LAN system with routers in a non-WDM conventional network. Note that the number of networks and routers in the network can be as large as the design requires. If Host 1 (Network 1) is directed to send information to a host on Network 3, the signal has to travel from Network 1, through Router 1, Router 2, Router 3 and then to Network 3. The system includes stored routing information about how routers are connected with each network or destination. Once Host 1's data transmission is received at Network 1, the system sends the signal from Network 1 to Network 3 based on the stored routing information. The routing information includes location of each network and router, etc., and network addresses corresponding to each location. For instance, in an IP network, each IP address has a format of WWW.XXX.YYY.ZZZ that represents different layers in the network. For example, YYY and ZZZ can represent subnets and user devices, respectively. Network addresses are simplified herein for illustrative purposes.

Based on the illustrated system configuration, the transmission goes from Network 1 with an assigned network address (NA) of NA 1.0 to Router 1 over serial link interface with network address NAS 1.0, to Router 2 interface with address NAS 2.0, and exits to Router 3 over interface with address NAS 2.1. Router 3 receives the information on interface with address NAS 3.0, and routes the packet to the final destination of Network 3 with an assigned network address of NA 3.0. For transmitting data, the system takes a hop-by-hop approach.

The network system in FIG. 2 is a relatively simple system for illustrative purposes. However, the system already needs N−1 interface connections at Router 2 in order to communicate with Network 2, Routers 1, 3 and N. In a more complex system, each router therein requires a prohibitively high number of interface connections or backbone switches that are electrical in nature with speed limitations.

In the case where one or more of the transmission links between routers is optical, as in many high-speed networks, an electro-optical or opto-electrical conversion is required at each interface with the transmission link. Where a portion of the transmission network is implemented for WDM transmission, e.g., a global network interconnecting various subnetworks, a further optical-electrical-optical conversion is required at each interface with the WDM network due to incompatibility between the optical output of the routers and the optical input for the WDM system. For example, in such an optical data transmission network including WDM links, a device known as a remodulator carries out the optical-electrical-optical conversion.

Application of the method of the invention eliminates the optical-electrical-optical conversion step performed by the remodulator by directly mapping addresses in IP at the initial electro-optical interface to an optical signal compatible with the WDM system. Note that IP is merely one of the many predetermined protocols with which the invention can be implemented. This also allows the implementation of fully optical local area or metropolitan area networks. The mapping correlates each address location with a corresponding WDM wavelength. The network then can transmit data from the originating router through the WDM portion of the network in a substantially all-optical mode, without opto-electric or electro-optical conversion.

Preferred embodiments of the invention are hereafter described. It is noted that, while the address mapping of the invention is implemented at the router level for the preferred embodiments, that should be viewed as a convenient interface and not to limit the scope of the invention. It will readily be seen by those skilled in the art that such address mapping could occur at the output of the local switch, as well as at the host levels in the originating network. The address mapping can also be implemented at the information source directly. In addition, the preferred embodiments are presented in the context of an optical channelization arrangement based on WDM. It is intended that the principles of the invention be applied for any such optical channelization arrangement.

Figure 3:
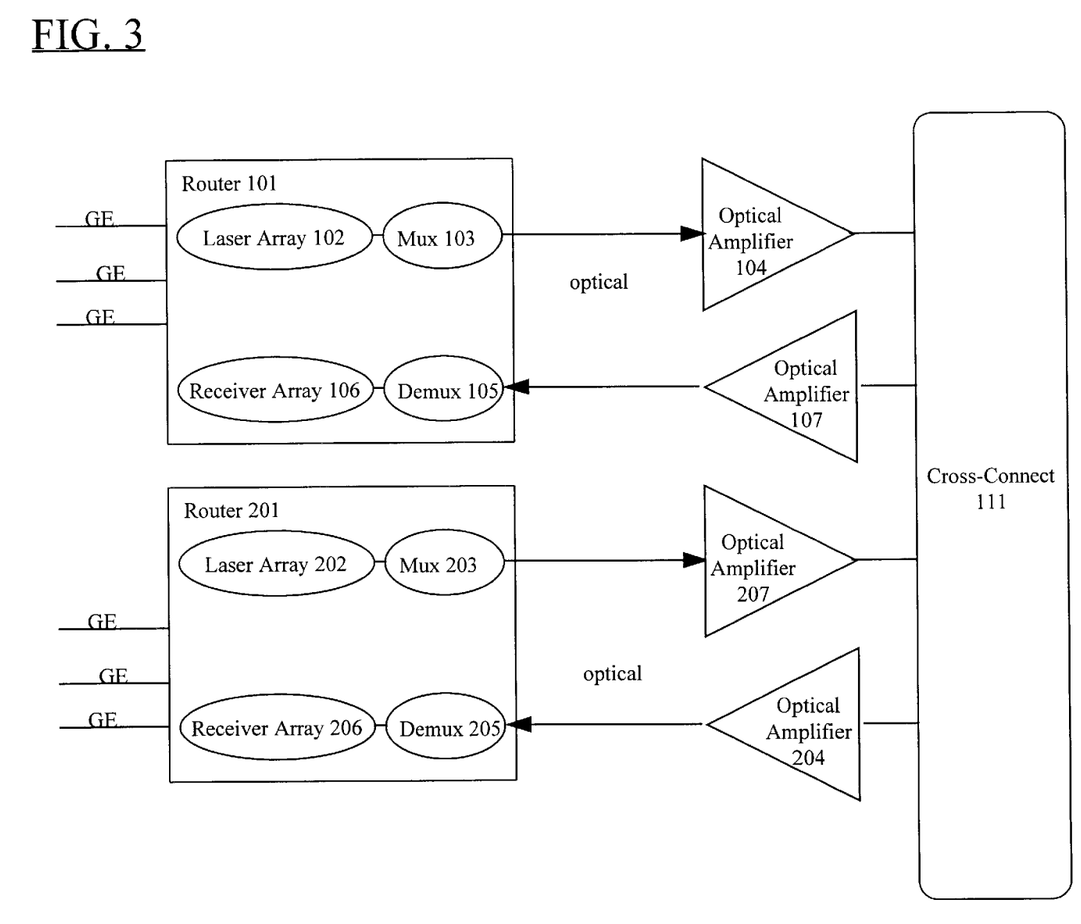
FIG. 3 shows an embodiment of the present invention in a WAN environment.

FIG. 3 shows a WDM network system in a WAN environment according to the present invention. In contrast with the system in FIG. 1, the illustrative router shown has a multi-frequency laser array and an optical multiplexer/demultiplexer, as well as a receiver array integrated therein. When Router 101 determines that a packet received over one of the GE interfaces is destined to Router 201, it looks up a field in a routing table (described further below) the wavelength $\lambda_i$ that corresponds to the designated destination, causes Laser Array 102 to generate an optical signal at $\lambda_i$ and then causes the information signal to be modulated with that optical signal by operation of Mux 103. After Mux 103 processes the signal, Optical Amplifier 104 amplifies the optical signal (if needed) and sends it to Cross-Connect 111. Cross-Connect 111 can be an ATM switch or a SONET multiplexer. The optical wavelengths are selected as a function of destination field values in the received packets. Optical Amplifier 204 then amplifies the signal (if needed) and transmits it to Demux 205 where it is demultiplexed for processing by Receiver Array 206 in Router 201. The optical signal at $\lambda_i$ is converted into an electrical signal and routed over the appropriate Ethernet interface on Router 201.

Note that the laser arrays (102, 202 in FIG. 3) are implemented as multi-frequency lasers and operate to code transmitted data in colors, i.e., a different wavelength for each destination address. Alternatively, a laser array formed of single frequency lasers can replace the multi-frequency laser. Modulation may be done in several ways. Illustratively, modulation of the Laser Array may be accomplished using ASK (Amplitude Shift Keying) or FSK (Frequency Shift Keying) modulation techniques. The laser array can be operated at a wavelength around 1,300 nm or 1,550 nm.

Figure 4:
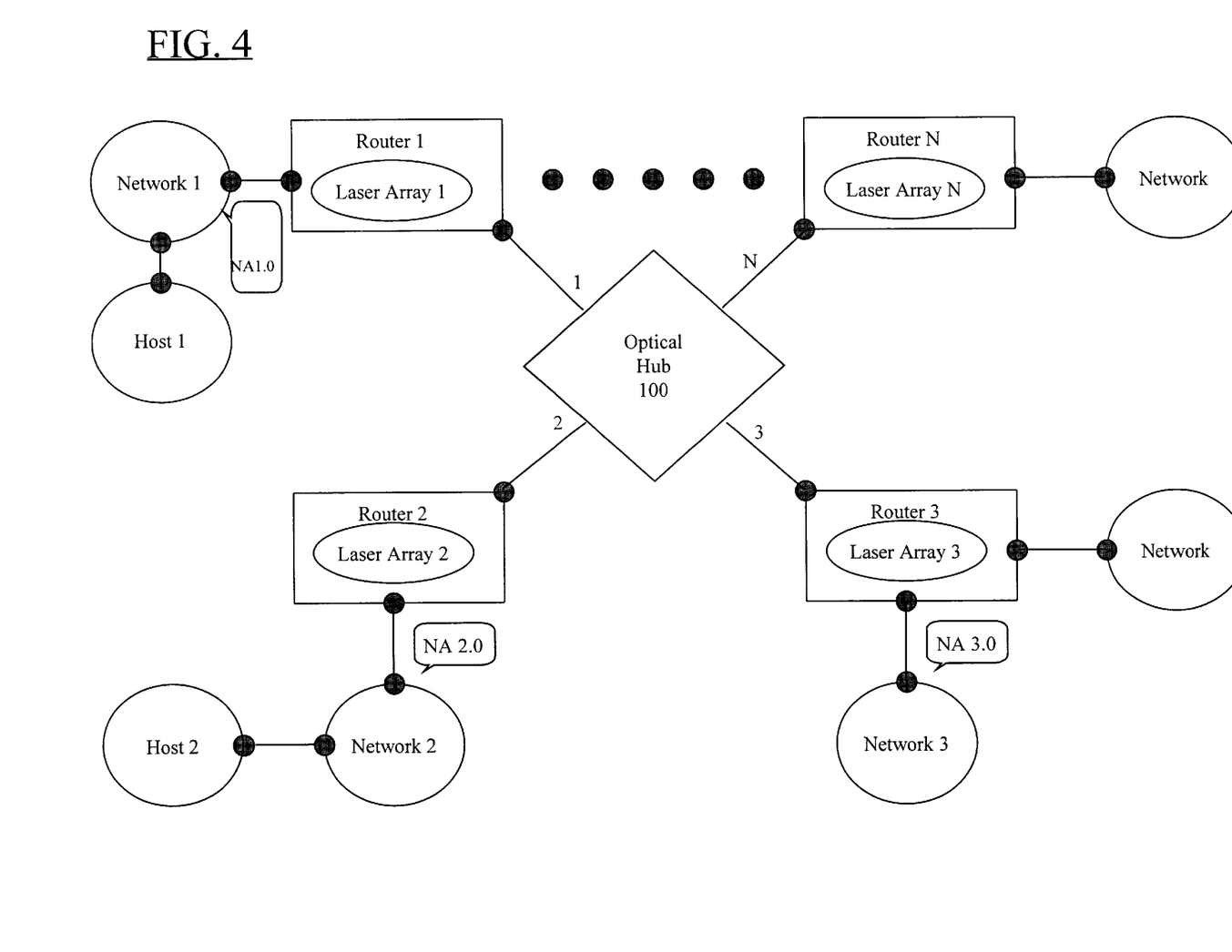
FIG. 4 shows a WDM network system with an optical hub, an embodiment of the present invention in a local area network (LAN) environment.

FIG. 4 shows a network system established according to the invention, where the WDM portion of the network is implemented in an optical hub established to provide routing between the various subnetworks in a LAN environment. In contrast with the system in FIG. 2, each illustrative router has integrated therein a multi-frequency laser array with a corresponding multiplexer, and a receiver array with a corresponding demultiplexer. Note that the figure is simplified for illustrative purposes, i.e., only the laser array is shown. A similar implementation can also be done in a MAN (metropolitan area network) environment as well. Also note that the WDM portion of the network in FIG. 4 can as well be implemented to incorporate an optical switch or a combination of switches.

Each of the Networks 1–N is assumed to be operating in an electrical mode, and each of the Routers 1–N is implemented, in a manner to be explained below, to provide a mapping of the signal from the network to an optical signal corresponding to the addressed network. Each of the Routers 1–N also has an output connected, via an optical transmission link, to a particular port of Optical Hub 100, or, in case of an optical switch, to a particular port of such switch. Optical Hub 100 as shown in FIG. 4 is a passive optical device with optical grating that reflects different colors with corresponding wavelengths to predetermined outputs.

Figure 5:
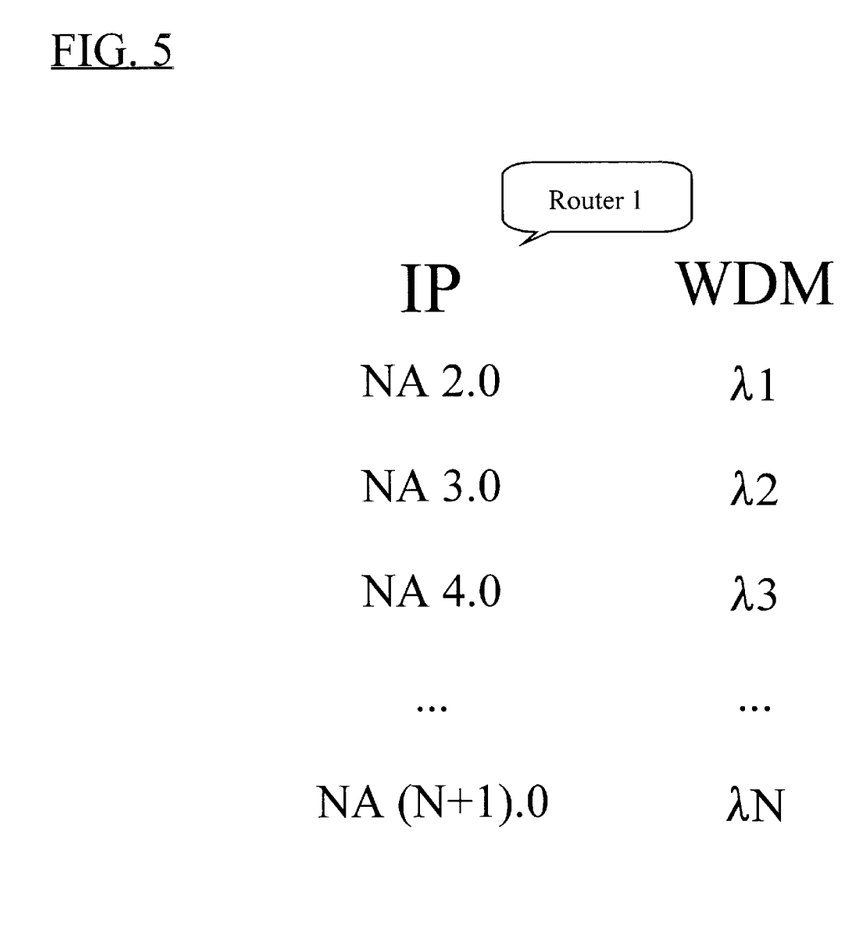
FIG. 5 shows an IP (Internet protocol) routing table with corresponding wavelength information for the WDM system.

It is well known that WDM operates by simultaneously transmitting a plurality of distinct wavelengths across an optical medium, where each of those wavelengths is modulated with a separate information channel. According to the method of the invention, each router has a routing table (for example, stored in a memory in Router 1, not shown) where there is a particular $\lambda_i$ corresponding to any known network address NA.i. In the case illustrated in FIG. 4, such destination addresses would be represented by NA 1.0, NA 2.0, NA 3.0, etc. Thus, for the case illustrated in the figure, each router would be associated with a particular NA destination in the routing table of every other router, e.g., Router 1 has NA 2.0 at $\lambda_1$ which is the address for Network 2 coupled via Router 2, NA 3.0 at $\lambda_2$ which is the address for Network 3 coupled via Router 3, . . . NA N.0 at $\lambda_{N-1}$ which is the address for Network N-1 coupled via Router N-1, and NA (N+1).0 at AN which is the address for Network N coupled via Router N. Router 2 can have Router 1 at $\lambda_{N-1}$, Router 3 at $\lambda_1$, Router N at $\lambda_{N-2}$, and so on. An exemplary routing table where the matching network addresses in the system for Router 1 is represented by an IP address is shown in FIG. 5. The routing table can be stored in a memory means in the router. Each network address (NA) is associated with a WDM wavelength so that Router 1 can transmit to and receive information from the network locations indicated by the IP network addresses. A fully optical routing table is maintained in an active optical router/switch where the entire network addresses and corresponding WDM wavelengths are tabulated.

Accordingly, a message from Host 1 on Network 1 which was destined to an address on Network 3 is mapped at Router 1 to a wavelength corresponding to that address, specifically the wavelength $\lambda_2$ for NA 3.0 which serves that destination address. That mapping can be, and in the preferred embodiment is, realized by use of a mapping means embodied as a multi-frequency laser array implemented in each router, which is operable to generate each of the wavelengths corresponding to the network addresses. As illustrated in FIG. 4, Laser Arrays 1, 2, 3, . . . , N are integrated onto Routers 1, 2, 3, . . . , N, respectively. The multi-frequency laser array can also be implemented directly at the originating host. Note that such multi-frequency lasers may readily be implemented using either distributed feedback (DFB) or distributed Bragg reflector (DBR) lasers, each of which is well known in the art.

Returning to the illustrative message from Host 1 to Network 3, that message arrives at Router 1 as an electrical signal where the router determines the network location of the addressee of that message. From that network address, Router 1 determines (based on the system routing table) the wavelength corresponding to that network location. Laser Array 1 is then caused to generate an optical signal at the desired wavelength, and the message from Host 1 is incorporated with that optical signal, preferably by modulation of the optical signal.

An information bearing optical signal at wavelength $\mu_2$ is then output from Router 1 and transported over an optical medium to Port 1 of Optical Hub 100. The optical signal from Router 1 at wavelength $\lambda_2$ is combined with other optical signals at other wavelengths into a multi-channel WDM signal. That WDM signal is then processed through the hub (or, alternatively, an optical switch) to an output point where wavelength $\lambda_2$ is split off, again using conventional optical splitting techniques, and directed to an optical transmission link connecting Port 3 of the hub with an input to Router 3. At Router 3, the information carrying optical signal at wavelength $\lambda_2$ is demodulated to recover the information signal in an electrical form, and that electrical signal is then routed via Network 3 in a known manner to the addressed host.

To reiterate, according to the method of the invention, each wavelength $\lambda$ of the WDM system corresponds to a network location, typically either a particular subnetwork or a specific network address according to a predetermined protocol, e.g., IP. IP is used in the embodiments herein since it is commonly used in networks implemented by Internet service providers. By mapping the network address (or location of a destination subnetwork) for a given signal directly to the WDM wavelength corresponding to that address (a subnetwork), the optical-electrical-optical conversion stage of prior art WDM networks is completely eliminated. The hop-by-hop approach in data transmission found in prior art systems is no longer needed as a result. Thus, network routing on a substantially all-optical basis is provided with a WDM system.

Figure 6A:
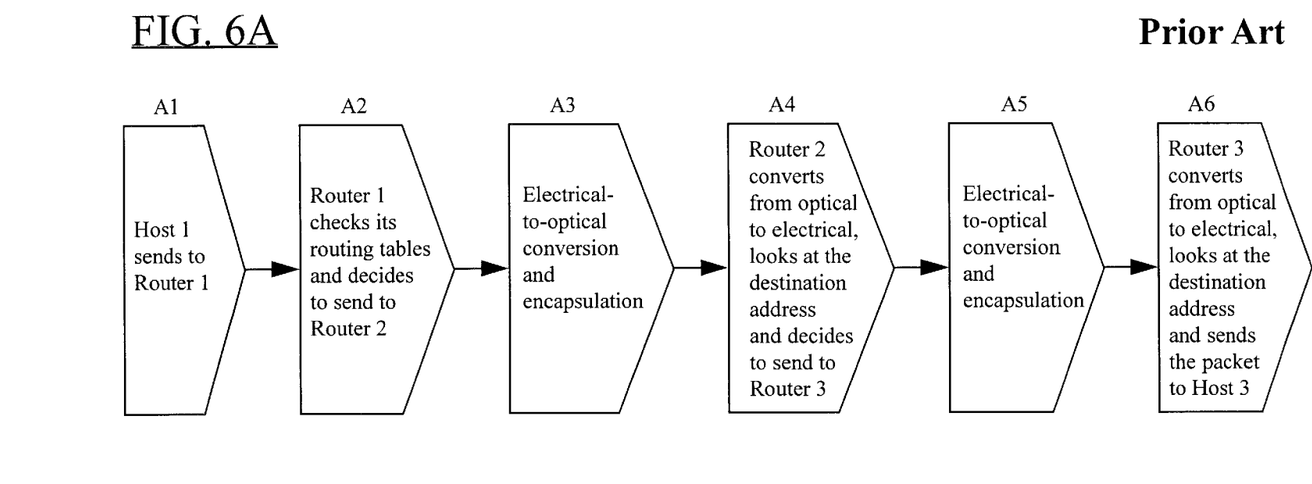
FIG. 6A is a flow chart illustrating the operation of a conventional network transmission method according to FIG. 3.
Figure 6B:
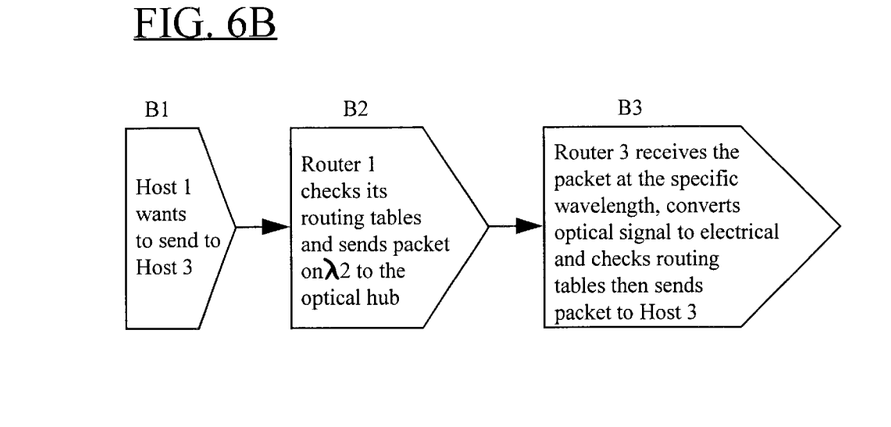
FIG. 6B is a flow chart illustrating the operation of the invention according to FIG. 4.

To better illustrate the advantages of the invention over conventional methods, FIGS. 6A and 6B are flow charts illustrating a conventional methodology and a method according to the present invention, respectively. FIG. 6A is a flow chart illustrating a conventional method of data transmission in a LAN environment. FIG. 6B is a flow chart that illustrates the method of the present invention. Note that the methodology has many applications including WDM systems with high-end computers, workstations, high performance multiplexers, high-end switches and routers.

Beginning with FIG. 6A, a conventional data transmission method in a non-WDM network system is shown, similar to the system in FIG. 2. In Step A1, Host 1 decides to send a data packet to Host 3. The first step is that Host 1 sends a packet to Router 1. In Step A2, Router 1 in turn checks its routing tables and decides to send the packet to Router 2. The system then performs encapsulation and electrical-to-optical conversion in Step A3, after which the packet is sent to Router 2. After receiving the packet, in Step A4 Router 2 converts the packet from an optical to an electrical signal, then looks at the destination address and decides to send the packet to Router 3. In Step A5, Router 2 performs encapsulation and electrical-to-optical conversion. Router 3 then receives the packet from Router 2. In Step A6, Router 3 converts the packet from an optical signal to an electrical signal, looks at the destination address and sends the packet to Host 3 based on the destination address. This hop-by-hop routing is processing-intensive and has a negative effect of data latency.

Note that the encapsulation steps illustrated in the figure are needed for sending data packets from router to router over serial links for high-layer protocols such as IP. Encapsulation can be done in any predetermined protocol. For instance, encapsulation can be performed in PPP, or Point-to-Point Protocol.

FIG. 6B shows a method of the present invention for use in a WDM network system in FIG. 4, with reference to the routing table in FIG. 5. In Step B1, Host 1 decides to send a packet to Host 3. Host 1 then sends to Router 1 that checks its routing tables (such as the one in FIG. 5) and finds that Host 3's network address (NA) location corresponds to $\lambda_2$, and sends the information to the optical hub as illustrated in Step B2. The optical signal is received by Router 3. Router 3 then converts the signal to an electrical signal, checks the routing tables and sends it to Host 3 in the final step of B3.

Comparing the methods illustrated in FIGS. 6A and 6B, it is readily seen that the method of the present invention is more expeditious and efficient. The method of the invention as shown in FIG. 6B does not require data flow direction and redirection between routers. The method of the present invention saves steps such as electrical-to-optical-to-electrical conversions and jumping from router to router until the data packet reaches the designated network destination. Instead, the invention simply directs the originating router to send to the optical hub based on the WDM wavelength information already integrated onto the router. The optical hub, being a passive device, simply directs the data packet to its destination that corresponds to the wavelength information from the originating router.

Figure 7:
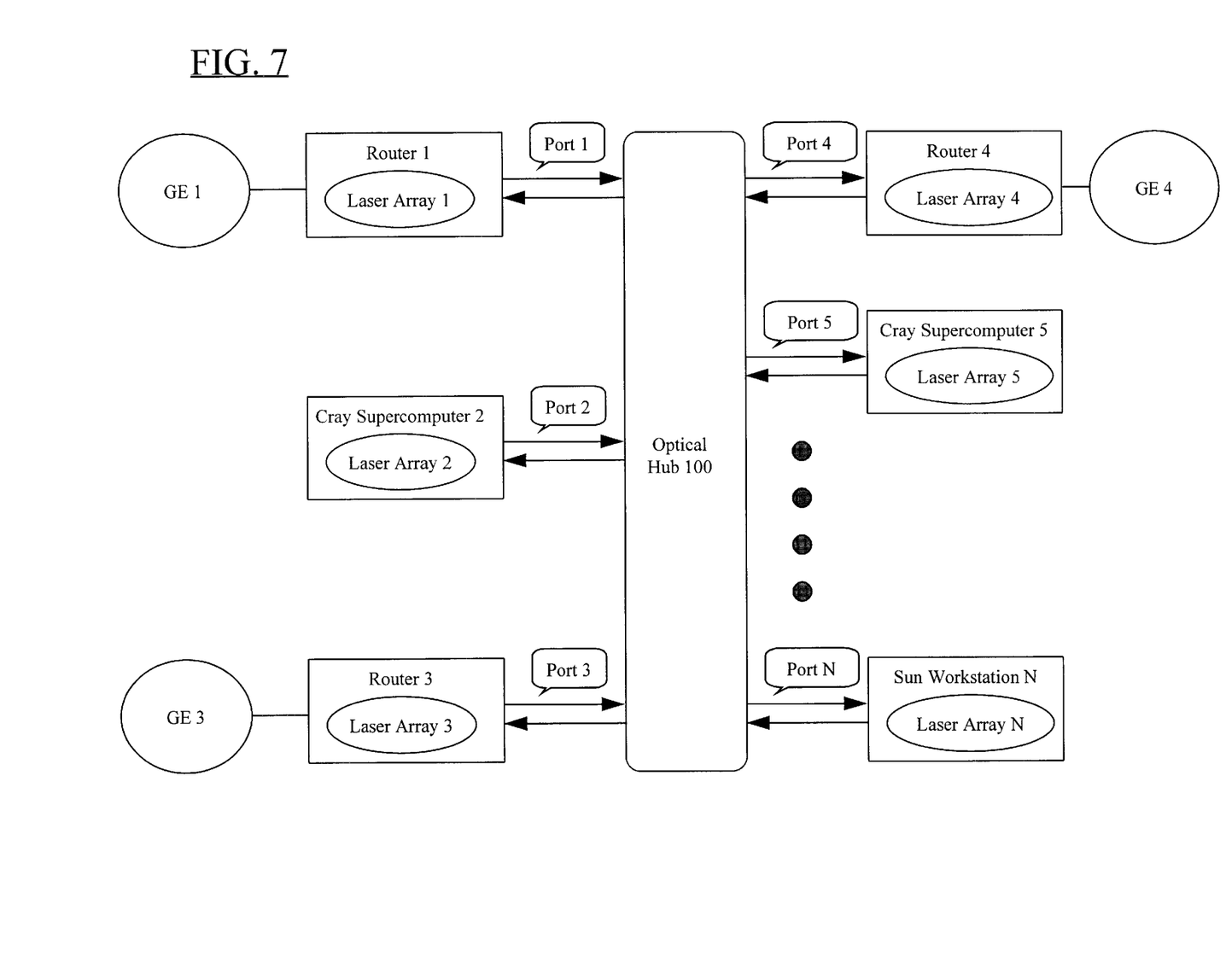
FIG. 7 is another embodiment of the present invention with an optical hub routing large networks in a WDM system wherein wavelength information is directly mapped in the originating routers and hosts.

FIG. 7 shows an embodiment of the present invention where a WDM-enabled optical hub operates to provide backbone in a WDM campus environment. The system in FIG. 7 shows that WDM mapping can be directly implemented at the host without intervening routers/switches. As illustrated in FIG. 7, Laser Arrays 1, 2, 3, 4, 5, . . . , N are integrated onto Routers 1, Cray Supercomputer 2, Router 3, Router 4, Cray Supercomputer 5, . . . , Sun Workstation N, respectively. Laser arrays are integrated onto the routers and host computers similar to the manner illustrated in Routers 101 and 102 of FIG. 2. Note that FIG. 7 is simplified for illustrative purposes.

If a host at GE 3 (Gigabit Ethernet network) coupled to Port 3 is sending data to the Cray Supercomputer 5 at Port 5, Router 3 coupled to GE 3 at Port 3 looks up a certain wavelength from a routing table that corresponds to the location of the Cray Supercomputer 5 at Port 5. Cray Supercomputer 5 has an internal WDM receiver (not shown) and transmitter (I/O) module as embodied in Laser Array 5. From Laser Array 3, Router 3 at Port 3 then causes its associated laser to transmit a color corresponding to that certain wavelength to Optical Hub 100. The color being transmitted bears information corresponding to the data being sent from GE 3 to Cray Supercomputer 5. Optical Hub 100 then conducts the certain wavelength to a predetermined output, which is Port 5 in this case. The Cray Supercomputer 5 receives the information from Port 5.

As also illustrated in FIG. 7, the multi-frequency laser array can be implemented directly in the originating host. For example, Cray Supercomputer 2 can transmit a WDM signal directly from Laser Array 2 to Sun Workstation N where Laser Array N can directly receive the information-bearing signal. This embodiment eliminates the need for routers/switches and along with them the interface connections needed.

In a similar manner to the illustrated examples described above, the invention can also be applied for connecting local area networks (LAN's), wide area networks (WAN's) and metropolitan area networks (MAN's) as well. The invention can be applied to data transmission systems connecting ATM (asynchronous transfer mode) networks, SONET's (synchronous optical networks) and GE (Giga-Ethernet) networks. In all cases, the interface device (illustratively, a router) causes an information signal to be transmitted in conjunction with an optical signal, where the wavelength of the optical signal corresponds to a network address for an associated WDM system.

Figure 8:
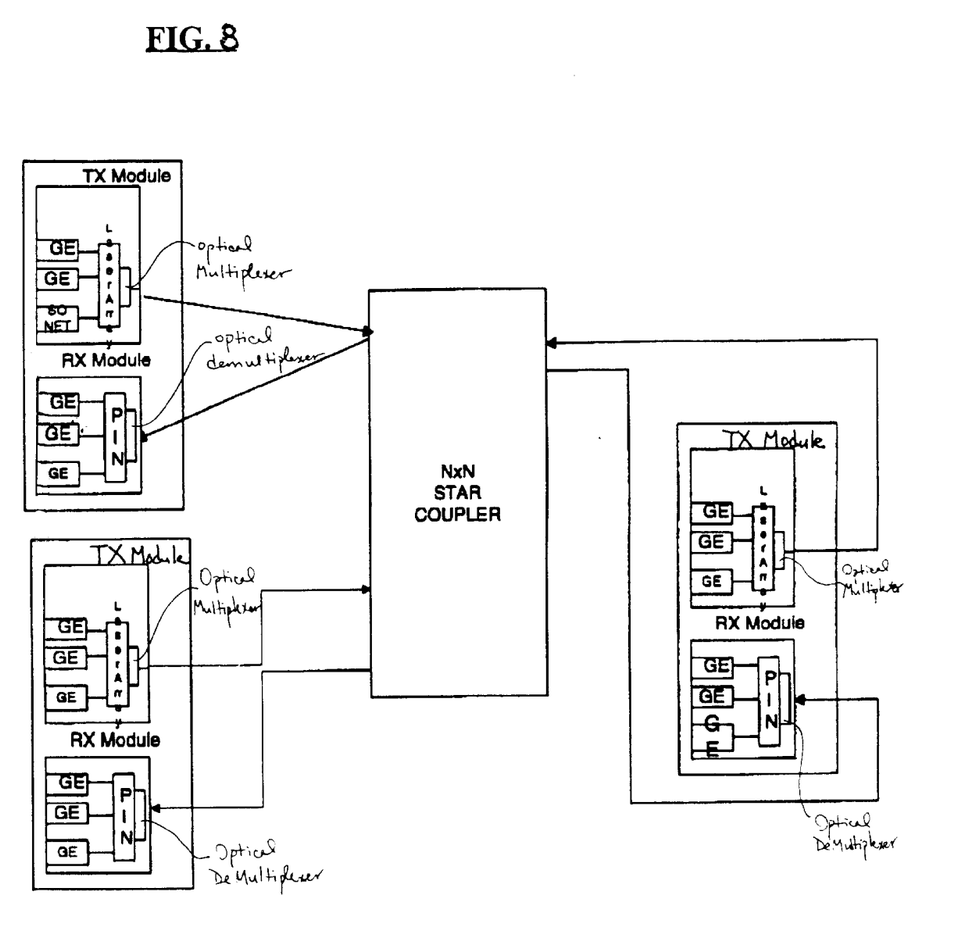
FIG. 8 is an embodiment of the present invention with a N×N Star Coupler in a WDM system.

Another embodiment of the invention is illustrated in FIG. 8. Referring to that figure, an optical hub with N inputs and N outputs, i.e., the N×N Star Coupler (optical hub), handles data transmission between transmitters, e.g., the TX Module, and receivers, e.g., the RX Modules. The number and configuration of modules are reduced and simplified for illustration purposes. Each TX Module has a laser array and an optical multiplexer. The TX Module has a selector (not shown) that selects a wavelength or wavelengths that correlate the destination information for data transmission. From the a zlaser array, the TX Module sends corresponding colors carrying the selected wavelength information to the optical hub, the N×N Star Coupler. The TX Module outputs an optical signal that is a combination of multiple wavelengths. The N×N Star Coupler then connects the optical signal, according to the wavelength information, to the corresponding RX Module. Each receiver has an optical demultiplexer followed by photo detectors (PIN). The demultiplexer receives the combined multi-wavelength signal and separates it to the different wavelength channels. After conversion, the electrical signals are presented to an individual receiver in a receiver array.

Note that an illustrative receiver for use with the system of the invention can be configured by using a narrow band optical filter followed by a detector. A filter that is used for this purpose is the FFPF (Fiber Fabry-Perot Filter) which is a high finesse tunable filter. The FFPF is compact, fiber compatible and inexpensive. Problems with long-term wavelength stability are addressed with the device being locked with a feedback loop on a permanent laser signal.

Changes and modifications in the specifically described embodiments can be carried out without departing from the scope of the invention. In particular, the present invention may be used in connecting networks of various types, in addition to a WDM system. Although preferred embodiments are disclosed herein, they do not limit the scope of the present invention.

We claim:
1. A method for data transmission in a data communication system with a plurality of data packet switching devices and mapping means integrated onto each of said plurality of data packet switching devices, comprising:

transmitting, in an optical domain, data through said system;

mapping of addresses, used by a predetermined protocol, corresponding to each location in said system utilizing a static routing table, by said plurality of data packet switching devices, said mapping correlates at least one of the addresses to wavelength information; and wherein at least one of a plurality of detector arrays and at least one of a plurality of laser arrays at said plurality of data packet switching devices are responsive to said mapping step.

2. The method of claim 1, further comprising steps of:

discerning source and destination of information in one of said plurality of detector arrays; and transmitting said information from one location to another location in said system based on said mapping step.

3. The method of claim 1, further comprising the steps of:

detecting a wavelength in one of said plurality of laser arrays integrated onto each device in said plurality of data packet switching devices;

identifying the wavelength for each lightwave being transmitted; and directing said information from one location to another location in said system based on said mapping step;

wherein said one of said plurality of laser arrays is correspondent with wavelength information, the wavelength information for use in wavelength division multiplexing.

4. The method of claim 1, wherein said mapping step is based on an Internet protocol (IP) and said mapping step maps IP-based addresses to correspond to wavelength information for use in wavelength division multiplexing.

5. In a data communication network having a plurality of data packet switching devices, an address mapping device integrated onto said plurality of data packet switching devices, said mapping device comprising:

mapping means integrated onto said plurality of data packet switching devices;

a plurality of detector arrays; and a plurality of laser arrays, each laser in said plurality of laser arrays being able to emit optical signals at different wavelengths that correspond to wavelengths configured for use in wavelength division multiplexing;

wherein said mapping means maps addresses used by a predetermined protocol, at said plurality of data packet switching devices, corresponding to each location in said network, said address mapping device permits interfacing between said plurality of data packet switching devices in an optical domain;

wherein said mapping means is capable of discerning source and destination of information utilizing a static routing table; and wherein said plurality of laser arrays and said plurality of detector arrays are responsive to said mapping means in directing information from one location to another location in said network.

6. The device of claim 5, wherein said mapping means maps Internet protocol (IP) addresses of each location in said network to correspond to wavelengths used in wavelength division multiplexing.

7. The device of claim 5, said device further comprising:

passive wavelength multiplexers, said multiplexers being able to combine optical signals at different wavelengths for use in wavelength division multiplexing; and passive wavelength demultiplexers, said demultiplexers being able to separate optical signals being combined by said multiplexers into optical signals with their respective wavelengths for use in wavelength division multiplexing.

8. A data communication system for transmitting and receiving data, comprising:

a plurality of data packet switching devices, each device being able to transmit and receive data to and from any device in said plurality of data packet switching devices;

each of said devices further comprising:

mapping means, said mapping means being integrated onto said each device for mapping of addresses at said plurality of data packet switching devices for data routed throughout said system;

a plurality of detector arrays; and a plurality of laser arrays, each laser in said plurality of laser arrays being able to emit optical signals at different wavelengths that correspond to wavelengths for use in wavelength division multiplexing;

wherein said mapping means permits interfacing between said plurality of data packet switching devices in an optical domain, said system being capable of discerning source and destination of information and transmitting said information from one location to another location in said system using a static routing table; and wherein said plurality of laser arrays and said plurality of detector arrays are responsive to said mapping means in directing said information from one location to another location in said system.

9. The system of claim 8, said plurality of data packet switching devices further comprising networks from the group consisting of local area networks (LAN's), Gigabit-Ethernet (GE) networks, wide area networks (WAN's) asynchronous transfer mode (ATM) networks, synchronous optical networks (SONEgs), and metropolitan area networks (MAN's).

10. A method for use in packet equipment, the method comprising the steps of:

receiving a packet utilizing one of a plurality of detector arrays, the packet comprising a field representing a destination address;

mapping in an optical domain utilizing a static routing table, at least a portion of the received destination address to one of a number of optical wavelengths; and transmitting the received packet using the mapped optical wavelength utilizing one of a plurality of laser arrays.

11. The method of claim 10, wherein the field represents an Internet protocol (IP) destination address.

12. The method of claim 10, wherein the mapping step further comprises:

accessing a static routing table, the routing table listing at least a portion of various destination addresses and corresponding optical wavelengths; and retrieving from the routing table the mapped optical wavelength as a function of at least the portion of the received destination address.

13. A router comprising:

a memory for storing a static routing table, where the routing table lists at least a portion of various destination addresses and corresponding optical wavelengths;

a plurality of laser transmitters for transmitting received packets on optical wavelengths selected from the routing table;

wherein the optical wavelengths are selected as a function of at least a portion of destination field values in the received packets.

14. A method for routing signals in a network with optical transmission channels, comprising the steps of:
- transmitting said signals into a medium of said network, said medium having multiple optical transmission channels;
- determining a routing protocol in said network wherein defined ones of said multiple optical transmission channels correspond to defined addresses served by said network; and
- mapping, into an optical domain utilizing a static routing table, ones of said signals to ones of said multiple optical transmission channels according to the routing protocol at an interface between said network and a source of said signals;
- wherein said multiple optical transmission channels are wavelength division multiplexing channels.

15. The method of claim 14, further comprising the step of implementing said interface in a router disposed between said network and a local switch serving said source of said signals.

16. The method of claim 14, further comprising the step of implementing said interface in a router disposed between said network and a local network serving said source of said signals.

17. The method of claim 14, wherein said step of determining further comprises correlating said routing protocol with said defined addresses to particular wavelengths for wavelength division multiplexing.

18. A method for data transmission in a data communication system by an originating host and mapping means integrated into the originating host, comprising:
- transmitting, in an optical domain, through said system;
- mapping of addresses, used by a predetermined protocol, corresponding to locations in said system utilizing a static routing table, by the originating host, said mapping correlates at least one of the addresses to wavelength information, the wavelength information configured for use in wavelength division multiplexing; and
- wherein at least one of a plurality of detector arrays and at least one of a plurality of laser arrays at said originating host is responsive to said mapping.

* * * * *